(12) United States Patent
Cheng et al.

(10) Patent No.: US 11,093,662 B2
(45) Date of Patent: Aug. 17, 2021

(54) MOTOR THERMOANALYSIS METHOD WITH TEMPERATURE FIELD DIRECTLY COUPLED WITH HEAT CIRCUIT

(71) Applicant: SOUTHEAST UNIVERSITY, Nanjing (CN)

(72) Inventors: Ming Cheng, Nanjing (CN); Sa Zhu, Nanjing (CN)

(73) Assignee: SOUTHEAST UNIVERSITY, Nanjing (CN)

( * ) Notice: Subject to any disclaimer, the term of this patent is extended or adjusted under 35 U.S.C. 154(b) by 268 days.

(21) Appl. No.: 15/758,854

(22) PCT Filed: Feb. 20, 2017

(86) PCT No.: PCT/CN2017/074080
§ 371 (c)(1),
(2) Date: Dec. 15, 2018

(87) PCT Pub. No.: WO2018/045721
PCT Pub. Date: Mar. 15, 2018

(65) Prior Publication Data
US 2019/0114385 A1 Apr. 18, 2019

(30) Foreign Application Priority Data
Sep. 8, 2016 (CN) .......................... 201610810769.9

(51) Int. Cl.
*G06F 30/17* (2020.01)
*G06F 30/23* (2020.01)
(Continued)

(52) U.S. Cl.
CPC .............. *G06F 30/17* (2020.01); *G06F 30/23* (2020.01); *G06F 30/367* (2020.01); *G06F 2119/08* (2020.01)

(58) Field of Classification Search
CPC ........ G06F 30/17; G06F 30/367; G06F 30/23; G06F 2119/08
See application file for complete search history.

(56) References Cited

U.S. PATENT DOCUMENTS

| 7,979,257 B2 * | 7/2011 | Yu ............................ G06G 7/50 703/9 |
| 8,539,408 B1 * | 9/2013 | Cheng ................... G06F 30/367 716/110 |

(Continued)

FOREIGN PATENT DOCUMENTS

KR   101394548 B1 *  5/2014

OTHER PUBLICATIONS

Google Patents Translation of KR101394548B1, Nov. 5, 20, 13 pages. (Year: 2020).*

(Continued)

*Primary Examiner* — Iftekhar A Khan
(74) *Attorney, Agent, or Firm* — CBM Patent Consulting, LLC

(57) ABSTRACT

A motor thermal analysis method with a temperature field directly coupled with a thermal circuit is used for modeling partial parts of the motor, and a thermal circuit method is used for modeling other parts. A temperature field is contacted with a thermal circuit through an equivalent temperature boundary and an equivalent convection boundary. The thermal circuit part is composed of one-dimensional finite elements, and two connecting boundaries are deemed as two boundary elements. An element stiffness matrix, an element loading matrix and an element mass matrix corresponding to the one-dimensional finite elements and the boundary elements are respectively overlaid to a global stiffness matrix, a global loading matrix and a global mass matrix, and the distribution of temperature in the temperature field and the (Continued)

distribution of temperature in the thermal circuit are obtained simultaneously by solving a whole system of linear equations.

6 Claims, 3 Drawing Sheets

(51) Int. Cl.
*G06F 30/367* (2020.01)
*G06F 119/08* (2020.01)

(56) References Cited

U.S. PATENT DOCUMENTS

| | | | | |
|---|---|---|---|---|
| 9,742,225 | B2* | 8/2017 | Klassen | H02K 19/10 |
| 9,773,080 | B2* | 9/2017 | Chang | G06F 30/331 |
| 10,318,675 | B2* | 6/2019 | Elford | G06T 17/20 |
| 2002/0157478 | A1* | 10/2002 | Seale | G01N 3/00 |
| | | | | 73/789 |
| 2003/0060999 | A1* | 3/2003 | Ogino | G01N 25/18 |
| | | | | 702/136 |
| 2004/0194051 | A1* | 9/2004 | Croft | G06F 30/23 |
| | | | | 703/2 |
| 2009/0319964 | A1* | 12/2009 | Kariat | G06F 30/367 |
| | | | | 716/136 |
| 2010/0023903 | A1* | 1/2010 | Pramono | G06F 30/367 |
| | | | | 716/106 |
| 2011/0295405 | A1* | 12/2011 | Sudo | C30B 15/10 |
| | | | | 700/104 |
| 2012/0179426 | A1* | 7/2012 | Fontes | G06F 30/23 |
| | | | | 703/1 |
| 2013/0262050 | A1* | 10/2013 | Nath | G06F 30/23 |
| | | | | 703/2 |
| 2014/0047407 | A1* | 2/2014 | Danielsson | G06F 8/20 |
| | | | | 717/104 |
| 2014/0200845 | A1* | 7/2014 | Yoshinari | G06F 30/23 |
| | | | | 702/136 |
| 2016/0215718 | A1* | 7/2016 | Willcox | F02D 35/025 |
| 2017/0282247 | A1* | 10/2017 | Cullinan | H01L 24/83 |
| 2018/0014734 | A1* | 1/2018 | Rogers | A61B 5/369 |
| 2018/0314780 | A1* | 11/2018 | Bertilsson | G06F 30/23 |
| 2018/0365357 | A1* | 12/2018 | James | G06F 30/15 |
| 2019/0138675 | A1* | 5/2019 | Fontes | G06F 30/23 |

OTHER PUBLICATIONS

Chin et al. "Transient Thermal Analysis using both Lumped-Circuit Approach and Finite Element Method of a Permanent Magnet Traction Motor", IEEE Africon 2004, pp. 1027-1036. (Year: 2004).*

Hsu et al. "A Rational Formulation of Thermal Circuit Models by Finite Element Method and Model Reduction Techniques for Electro-Thermal Simulation", IEEE, 1994, pp. 67-72. (Year: 1994).*

Hwang et al. "Novel Approach to the Solution of Temperature Distribution in the Stator of an Induction Motor", IEEE Transactions on Energy Conversion, vol. 15, No. 4, Dec. 2000, pp. 401-406. (Year: 2000).*

Pentenrieder, Bastian. "Finite Element Solutions of Heat Conduction Problems in Complicated 3D Geometries Using the Multigrid Method", Jul. 29, 2005, 92 pages. (Year: 2005).*

* cited by examiner

MOTOR THERMOANALYSIS METHOD WITH TEMPERATURE FIELD DIRECTLY COUPLED WITH HEAT CIRCUIT

TECHNICAL FIELD

The present invention relates to the field of finite element thermoanalysis, and more particularly, to a motor thermoanalysis method with a temperature field directly coupled with a thermal circuit.

BACKGROUND

With the aggravation of energy crisis, the social requirements on the motor with high efficiency and low cost are continuously increased. However, accurate motor design not only needs to calculate the electromagnetic performance of the motor, but also needs to accurately calculate the temperature rise of the motor during working to guarantee its safe operation. The temperature rise of the motor is conventionally calculated based on a thermal circuit method, but this method can only calculate the average temperature rise of a winding; moreover, thermal circuit model establishment and parameter calibration need to be combined with an experiment. With the appearance of a finite element method and the rapid development of computer technologies, many mature finite element software platforms for commercial purpose have been continuously developed. The technology of CAE (computer aided engineering) has become an unnecessary tool.

However, the current motor thermoanalysis simulation software completely conducts modeling and calculation on the basis of the thermal circuit method, while some other temperature field analysis tools completely conducts solving on the basis of the finite element. Pure thermal circuit modeling can only represent the average temperature of each part, and there are errors when conducting modeling to the part with complicated geometric structures and uneven heat source distribution. Moreover, the traditional finite element modeling method cannot simulate the heat convection inside an enclosed motor, such as the heat convection between an end winding and a motor shell, and the heat convection bet a stator and a rotor; moreover, the mesh generation scale is larger and the calculation time is long.

SUMMARY

Object of the present invention: regarding to the prior art above, a motor finite element thermoanalysis method with a temperature field directly coupled with a thermal circuit is provided, so as to integrate two the advantages of two methods to provide a quicker and more accurate modeling analysis tool to users.

Technical solution: a motor thermoanalysis method with a temperature field directly coupled with a thermal circuit comprises the following steps:

1) analyzing a motor needing temperature rise calculation, selecting an area needing modeling by a finite element method and an area needing modeling by a thermal circuit method, and connecting the two regions with some equivalent convection boundaries and some equivalent temperature boundaries of the two areas; conducting geometric modeling, parameter setting and mesh generation to the area modeled by the finite element method; establishing a thermal circuit model to the area modeled by the thermal circuit method according to an empirical formula, and calculating the numerical values of each heat resistor, heat capacitor capacity and heat source;

2) converting the element in each thermal circuit model into a one-dimensional finite element;

3) confirming a weak solution form of a differential equation of heat conduction containing the equivalent convection boundary and the equivalent temperature boundary;

4) establishing a boundary element corresponding to the equivalent convection boundary;

5) establishing a boundary element corresponding to the equivalent temperature boundary; and 6) overlaying element matrixes of a fluid element, the boundary element and the one-dimensional finite element to a global stiffness matrix, a global mass matrix and a global loading matrix, solving a global equation set, and obtaining the distribution of temperature of the thermal circuit area and the distribution of temperature of the finite element area simultaneously.

Further, in step 2), regarding to one element in the thermal circuit model, the heat resistor of the element is set as R, the node temperatures at the two ends of the heat resistor are respectively $T_1$ and $T_2$, the heat capacitors connected by the nodes at the two ends are $C_1$ and $C_2$, the concentrated heat sources connected by the nodes at the two ends are $f_1$ and $f_2$, the total heat flows flowing into the nodes at the two ends from other nodes or boundaries are $Q_1$ and $Q_2$, and the following formula can be obtained according to the conservation of energy:

$$[C] \cdot \left\{\frac{dT}{dt}\right\} + [R] \cdot \{T\} = \{f\} + \{Q\}$$

$$[C] = \begin{bmatrix} C_1 & 0 \\ 0 & C_2 \end{bmatrix}, [R] = \begin{bmatrix} \frac{1}{R} & -\frac{1}{R} \\ -\frac{1}{R} & \frac{1}{R} \end{bmatrix}, \left\{\frac{dT}{dt}\right\} = \begin{bmatrix} \frac{dT_1}{dt} \\ \frac{dT_2}{dt} \end{bmatrix}$$

$$\{T\} = \begin{bmatrix} T_1 \\ T_2 \end{bmatrix}, \{f\} = \begin{bmatrix} f_1 \\ f_2 \end{bmatrix}, \{Q\} = \begin{bmatrix} Q_1 \\ Q_2 \end{bmatrix}$$

wherein, $$\frac{dT}{dt}$$

represents the change rate of the node temperatures at the two ends of the heat resistor with the time; compared with the structures of the element stiffness matrix, the element mass matrix and the element loading matrix in the finite element calculation, [C] is the element mass matrix of the one-dimensional finite element corresponding to the thermal circuit element, [R] is the corresponding element stiffness matrix, and {f} is the corresponding element loading matrix; and {Q} is a corresponding matrix of the total heat flows flowing to the nodes at the two ends from other nodes or boundaries.

Further, in step 3), the weak solution form of a partial differential equation containing the equivalent convection boundary and the equivalent temperature boundary is as follows:

$$\int_\Omega c \frac{\partial T}{\partial t} \delta T \cdot d\Omega + \int_\Omega (k\nabla T) \cdot (\nabla \delta T) \cdot d\Omega +$$

$$\int_{\Gamma_{hu}} h_u(T-T_u) \cdot \delta T \cdot d\Gamma + \int_{\Gamma_a} h_a \cdot T \cdot \delta T \cdot d\Gamma =$$

$$\int_{\Gamma_a} h_a \cdot T_a \cdot \delta T \cdot d\Gamma + \int_\Omega q \cdot \delta T \cdot d\Omega + \int_{\Gamma_{Te}} \left(k\frac{\partial T}{\partial n}\right) \cdot \delta T \cdot d\Gamma$$

wherein, $\Omega$ is a solution area corresponding to a geometric model subjected to mesh generation; c is a product of material density and specific heat capacity, T is temperature, t is time, k is a heat conductivity coefficient, δT is virtual displacement, and ∇ is a hamiltonian operator; $\Gamma_{hu}$ is the equivalent convection boundary, $h_u$ is a convection heat dispersion parameter on $\Gamma_{hu}$, and $T_u$ is an environmental temperature corresponding to $\Gamma_{hu}$, which is equal to the temperature of some node in the thermal circuit area; $\Gamma_a$ is an ordinary convection boundary on the finite element area, $h_a$ is a convection heat dispersion parameter on $\Gamma_a$, and $T_a$ is an environmental temperature corresponding to $\Gamma_a$; $\Gamma$ is a boundary variable, and q is heat source density; and $\Gamma_{Te}$ is an equivalent temperature boundary, and n is a unit normal vector of an outer boundary.

Further, in step 4), the equivalent convection boundary obtained according to the conservation of energy is as follows:

$$\int_{\Gamma_{hu}} h_u \cdot (T_u - T) \cdot d\Gamma = Q_u$$

wherein, $Q_u$ is the total heat flow flowing to the equivalent convection boundary from the thermal circuit area and other boundaries; when the finite element method is used to conduct dissociation and subdivision to the solution area, if the temperature $T^{(e)}$ on an element e on the equivalent convection boundary is represented as:

$$T^{(e)} = \sum_{j=1}^{m} T_j^{(e)} \cdot N_j^{(e)}$$

wherein, m is the total nodes contained in the element e, $T_j^{(e)}$ is the temperature of a node j, $N_j^{(e)}$ is a base function of interpolation of the element corresponding to the node j, then the discretization expression of the energy conservation expression on the equivalent convection boundary is as follows:

$$\sum_{\Gamma_{hu}} \left( h_u \cdot T_u \cdot S_e - \sum_{j=1}^{m} \left( T_j^{(e)} \cdot \int_{\Gamma_e} h_u \cdot N_j^{(e)} \cdot d\Gamma \right) \right) = \sum_{\Gamma_{hu}} Q_u^{(e)} = Q_u$$

wherein, $S_e$ is the area of the element e, re is the area where the element e is located, and $Q_u^{(e)}$ is the heat flow flowing from the element e; and an element stiffness matrix $[N]_{\Gamma_{hu}}^{(e)}$ corresponding to the equivalent convection boundary element obtained by modifying the discretization expression and the third item from the left end in a weak solution form is as follows:

$$[N]_{\Gamma_{hu}}^{(e)} = \begin{bmatrix} a_{1,1} & a_{1,2} & \ldots & a_{1,m} & b_{1,(m+1)} \\ a_{2,1} & a_{2,2} & \ldots & a_{2,m} & b_{2,(m+1)} \\ \ldots & \ldots & \ldots & \ldots & \ldots \\ a_{m,1} & a_{m,2} & \ldots & a_{m,m} & b_{m,(m+1)} \\ b_{(m+1),1} & b_{(m+1),2} & \ldots & b_{(m+1),m} & c_{(m+1),(m+1)} \end{bmatrix}$$

wherein, m+1 is corresponding to the node representing the environmental temperature corresponding to $\Gamma_{hu}$ in the thermal circuit area, and matrix elements $a_{i,j}$, $b_{i,j}$ and $c_{i,j}$ are as follows:

$$a_{i,j} = \int_{\Gamma_e} h_u \cdot N_i^{(e)} \cdot N_j^{(e)} \cdot d\Gamma$$

$$b_{i,(m+1)} = b_{(m+1),i} = -\int_{\Gamma_e} h_u \cdot N_i^{(e)} \cdot d\Gamma$$

$$c_{(m+1),(m+1)} = h_u \cdot S_e$$

$N_j^{(e)}$ is a base function of interpolation of corresponding element for node i.

Further, in step 5), the equivalent temperature boundary is obtained according to the conservation of energy as follows:

$$\int_{\Gamma_{Te}} \left( k \cdot \frac{\partial T}{\partial n} \right) \cdot d\Gamma = Q_e$$

wherein, $Q_e$ is the total heat flow flowing into the equivalent temperature boundary $\Gamma_{Te}$ from the area modeled by the thermal circuit method and other boundaries; and if more than one node are comprised, the temperature $T^{(w)}$ on a fluid element w on the equivalent temperature boundary $\Gamma_{Te}$ is represented as:

$$T^{(w)} = \sum_{j=1}^{n} T_j^{(w)} \cdot N_j^{(w)} = \sum_{j=1}^{l} T_j^{(w)} \cdot N_j^{(w)} + T_e \cdot \sum_{j=l+1}^{n} N_j^{(w)}$$

wherein, $T_j^{(w)}$ is the temperature of a node j in the fluid element w, and $N_j^{(w)}$ is a base function of interpolation of the element corresponding to the node j in the fluid element w; the total number nodes comprised in the fluid element w is n, wherein a node 1 to a node l are not located on the equivalent temperature boundary $\Gamma_{Te}$, while a node l+1 to a node n are located on the equivalent temperature boundary $\Gamma_{Te}$, and the temperature of all the nodes on the equivalent temperature boundary $\Gamma_{Te}$ is $T_e$;

for the fluid element w, if assuming that a balance equation on the element can be obtained according to the weak solution form as follows:

$$[C]^{(w)} \cdot \frac{d}{dt} \{T\}^{(w)} + [K]^{(w)} \cdot \{T\}^{(w)} = \{f\}^{(w)} + \{Q\}^{(w)}$$

$$[C]^{(w)} = \begin{bmatrix} c_{1,1}^{(w)} & \ldots & c_{1,l}^{(w)} & \ldots & c_{1,n}^{(w)} \\ \ldots & \ldots & \ldots & \ldots & \ldots \\ c_{l,1}^{(w)} & \ldots & c_{l,l}^{(w)} & \ldots & c_{l,n}^{(w)} \\ \ldots & \ldots & \ldots & \ldots & \ldots \\ c_{n,1}^{(w)} & \ldots & c_{n,l}^{(w)} & \ldots & c_{n,n}^{(w)} \end{bmatrix},$$

$$[K]^{(w)} = \begin{bmatrix} k_{1,1}^{(w)} & \ldots & k_{1,l}^{(w)} & \ldots & k_{1,n}^{(w)} \\ \ldots & \ldots & \ldots & \ldots & \ldots \\ k_{l,1}^{(w)} & \ldots & k_{l,l}^{(w)} & \ldots & k_{l,n}^{(w)} \\ \ldots & \ldots & \ldots & \ldots & \ldots \\ k_{n,1}^{(w)} & \ldots & k_{n,l}^{(w)} & \ldots & k_{n,n}^{(w)} \end{bmatrix}, \{f\}^{(w)} = \begin{bmatrix} f_1^{(w)} \\ \ldots \\ f_l^{(w)} \\ \ldots \\ f_n^{(w)} \end{bmatrix}, \{T\}^{(w)} = \begin{bmatrix} T_1^{(w)} \\ \ldots \\ T_l^{(w)} \\ \ldots \\ T_n^{(w)} \end{bmatrix},$$

$$\{Q\}^{(w)} = \begin{bmatrix} 0 & \ldots & \int_{\Gamma_w} N_{l+1}^{(w)} k \frac{\partial T}{\partial n} d\Gamma & \ldots & \int_{\Gamma_w} N_n^{(w)} k \frac{\partial T}{\partial n} d\Gamma \end{bmatrix}^T$$

wherein, $[C]^{(w)}$, $[K]^{(w)}$ and $\{f\}^{(w)}$ are an element mass matrix, an element stiffness matrix and an element loading matrix of the fluid element respectively; $\{T\}^{(w)}$ is a vector composed of the temperature of each node, and $\{Q\}^{(w)}$ represents the vector of the heat flow flowing from the boundary node; and $\Gamma_w$ is the face of the fluid element w on $\Gamma_{Te}$;

for more than one node located on the fluid element w on the equivalent temperature boundary $\Gamma_{Te}$, since the temperatures of the node l+1 to the node n thereon are all equal to $T_e$, the element matrixes above are combined and represented as follows:

$$[C]^{(w)} = \begin{bmatrix} c_{1,1}^{(w)} & \cdots & c_{1,l}^{(w)} & \sum_{j=l+1}^{n} c_{1,j}^{(w)} \\ \cdots & \cdots & \cdots & \cdots \\ c_{l,1}^{(w)} & \cdots & c_{l,l}^{(w)} & \sum_{j=l+1}^{n} c_{l,j}^{(w)} \\ \sum_{j=l+1}^{n} c_{j,1}^{(w)} & \cdots & \sum_{j=l+1}^{n} c_{j,l}^{(w)} & \sum_{i=l+1}^{n}\sum_{j=l+1}^{n} c_{i,j}^{(w)} \end{bmatrix},$$

$$[K]^{(w)} = \begin{bmatrix} k_{1,1}^{(w)} & \cdots & k_{1,l}^{(w)} & \sum_{j=l+1}^{n} k_{1,j}^{(w)} \\ \cdots & \cdots & \cdots & \cdots \\ k_{l,1}^{(w)} & \cdots & k_{l,l}^{(w)} & \sum_{j=l+1}^{n} k_{l,j}^{(w)} \\ \sum_{j=l+1}^{n} k_{j,1}^{(w)} & \cdots & \sum_{j=l+1}^{n} k_{j,l}^{(w)} & \sum_{i=l+1}^{n}\sum_{j=l+1}^{n} k_{i,j}^{(w)} \end{bmatrix},$$

$$\{f\}^{(w)} = \begin{bmatrix} f_1^{(w)} \\ \cdots \\ f_l^{(w)} \\ \sum_{j=l+1}^{n} f_j^{(w)} \end{bmatrix},$$

$$\{T\}^{(w)} = [T_1^{(w)} \ \cdots \ T_l^{(w)} \ T_e]^T,$$

$$\{Q\}^{(w)} = \left[ 0 \ \cdots \ 0 \ \int_{\Gamma_w} \sum_{j=l+1}^{n} N_j^{(w)} k \frac{\partial T}{\partial N} d\Gamma \right]^T =$$

$$\left[ 0 \ \cdots \ 0 \ \int_{\Gamma_w} k \frac{\partial T}{\partial N} d\Gamma \right]^T = [0 \ \cdots \ 0 \ Q_e^{(w)}]^T$$

wherein, $Q_e^{(w)}$ represents the heat flow flowing from the face on the equivalent temperature boundary $\Gamma_{Te}$ through the fluid element w, and the summation thereof is equal to $Q_e$; in the process of combining the element matrixes of the fluid element w to a global matrix, all the nodes on the equivalent temperature boundary occupy the same position as that of the corresponding nodes of the boundary in the thermal circuit area in the global matrix.

Beneficial effects: according to the method, the finite element method is used for modeling partial parts of the motor, and the thermal circuit method is used for modeling other parts of the motor. The temperature field is contacted with the thermal circuit through the equivalent temperature boundary $\Gamma_{Te}$ and the equivalent convection boundary $\Gamma_{hu}$. $\Gamma_{Te}$ is different from the ordinary constant temperature boundary $\Gamma_0$ in that the temperature on $\Gamma_0$ is known, while the temperature of $\Gamma_{Te}$ is unknown and is equal to the temperature of some node in the thermal circuit. Similarly, $\Gamma_{hu}$ is different from the ordinary convection boundary $\Gamma_a$ in that the corresponding environmental temperature on $\Gamma_a$ is known, while the corresponding environmental temperature of $\Gamma_{hu}$ is unknown and is equal to the temperature of some node in the thermal circuit. The thermal circuit part during solving is deemed as being composed of one-dimensional finite elements, and two connecting boundaries are deemed as two boundary elements. Finally, the element stiffness matrix, the element loading matrix and the element mass matrix corresponding to the one-dimensional finite elements and the boundary elements are respectively overlaid to the global stiffness matrix, the global loading matrix and the global mass matrix, and the distribution of temperature in the temperature field and the distribution of temperature in the thermal circuit are obtained simultaneously by solving the whole system of linear equations. The motor thermoanalysis solution conducted by the method can unify the solution problem of the thermal circuit area and the solution problem of the finite element area together, so as to provide a more convenient platform to the users. The finite element method has the advantage on stimulating complicated geometric construction and uneven heat source distribution, while the thermal circuit method is more convenient for stimulating the heat convection in the interior of the motor, and a more accurate and high efficient motor thermoanalysis model can be obtained through combining the finite element method and the thermal circuit method together.

DETAILED DESCRIPTION

The present invention is further described hereinafter with reference to the drawings.

Figure 1:
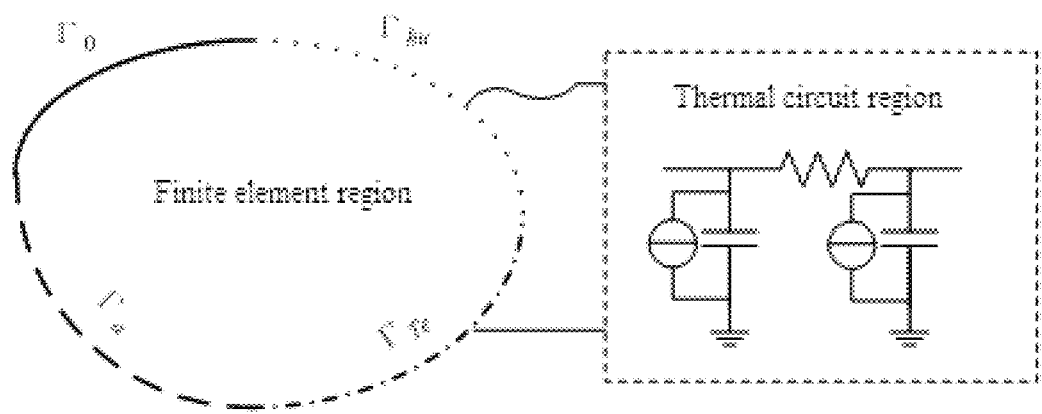
FIG. 1 is a schematic diagram of a model with a temperature field directly coupled with a thermal circuit.
Figure 2:
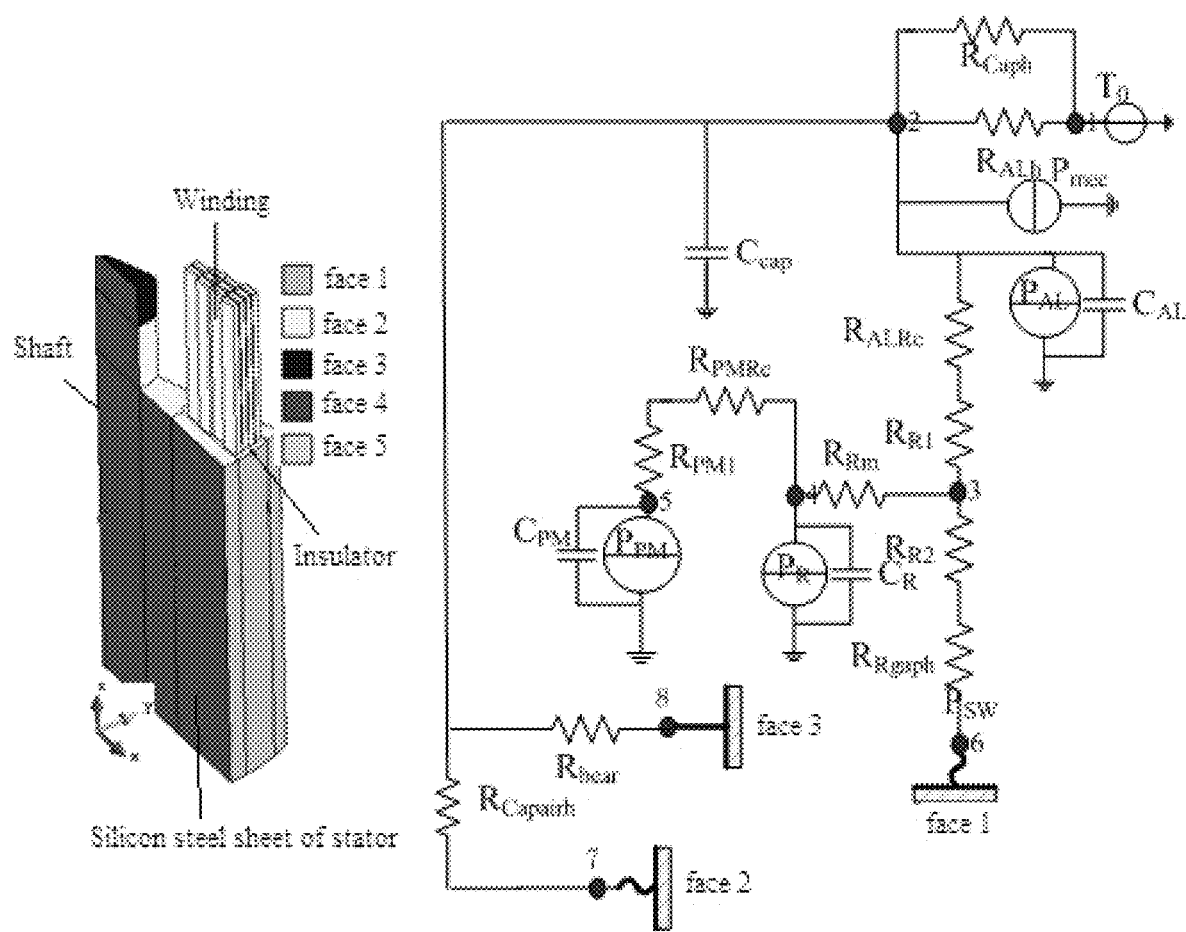
FIG. 2 is a schematic diagram of a permanent magnet motor model having an outer rotor structure with a temperature field coupled with a thermal circuit.

In the embodiment, a permanent magnet motor having an outer rotor structure is taken as an example to further describe the method. Considering the unevenly distributed AC copper losses of a winding, a finite element method is used in an inner stator part of the motor for modeling, while a thermal circuit method is used in an outer rotor part for modeling, as shown in FIG. 2. In a thermal circuit area, a node 1 represents an environmental temperature, a node 2 represents the temperature of an end cap and an aluminum shell, a node 3 represents the medium temperature of silicon steel sheets of the rotor, a node 4 represents the average temperature of the silicon steel sheets of the rotor, a node 5 represents the average temperature of a permanent magnet, a node 6 represents the average temperature of an air gap, a node 7 represents the average temperature of the air at the end part, and a node 8 represents the average temperature of a shaft end part. $R_{caph}$ represents a convection heat exchange resistor between the end cap and the external environment, $R_{ALh}$ represents a convection heat exchange resistor between the aluminum shell and the external environment, $R_{ALRc}$ represents a contact heat resistor between the aluminum shell and the rotor, $R_{R1}$, $R_{R2}$ and $R_{Rm}$ represent the equivalent resistors of the silicon steel sheets of the rotor, $R_{PMRc}$ is a contact heat resistor between the permanent magnet and the rotor, $R_{PM1}$ is the heat resistor of the permanent magnet, $R_{gaph}$ is a convection heat exchange resistor between the inner surface of the rotor and the air gap, $R_{bear}$ represents the heat resistor of a bearing, and $R_{Capairh}$ represents a convection heat resistor between the end cap and the air at the end part. To represents the temperature of the external environment, $P_{mec}$ represents mechanical loss, $P_{AL}$ represents eddy-current loss in the aluminum shell, $P_R$ represents the iron loss of the rotor, and $P_{RM}$ represents the loss of the permanent magnet. $C_{AL}$ represents the heat capacitor of the aluminum shell, $C_{cap}$ represents the heat capacitor of the end cap, $C_R$ represents the heat capacitor of the silicon steel sheets of the rotor, and $C_{PM}$ is the heat capacitor of the permanent magnet. In a finite element area, a face 1 represents the outer surface of the inner stator, a face 2 represents the outer surface of the end winding, a face 3 represents the outer surface of the shaft end part, a face 4 represents two side faces of the finite element area, and a face 5 represents the surface of the end part of the winding and the bottom surface of the whole finite element area. The face 1 is connected to a node 6 in the thermal circuit area through an equivalent convection heat dispersion boundary, representing that the environmental temperature of the surface of the inner stator is the average temperature of the air gap. The face 2 represents the outer surface of the end winding, and is connected to a node 7 through an equivalent convection boundary as well, representing the convection heat exchange between the end part of the winding and the air inside the end cap. The face 3 represents the outer surface of the shaft end part, and is connected to a node 8 through an equivalent temperature boundary, representing that all temperatures on the face 3 are the same as the temperature of the node 8. A rotational symmetric constraint condition is used in the face 4, representing that same temperature distributions on the two side faces are the same. An adiabatic boundary condition is applied to the face 5, representing the symmetry of the model.

As shown in FIG. 2, the node 7 is located at the face 2, representing the average temperature of the air at the end part, the node 8 is located at the face 3, representing the average temperature of the shaft end part, and the node 6 is located at the face 1, representing the average temperature of the air gap.

The node 7 is further connected to the heat resistor $R_{Capairh}$, and the heat resistor represents the convection heat resistor between the end cap and the air at the end part.

The node 8 is further connected to the heat resistor $R_{bear}$, and the heat resistor the heat resistor of the bearing.

The other ends of the heat resistor $R_{Capairh}$ and the heat resistor $R_{bear}$ are both connected to the node 2, and the node 2 represents the temperature of the end cap and the temperature of the aluminum shell.

A heat capacitor $C_{cap}$ represents the heat capacitor of the end cap, one end thereof is connected to the ground, and the other end is connected to the node 2.

One end of mechanical loss $P_{mec}$ is connected to the node 2, and the other end of the mechanical loss is connected to the ground.

The heat resistor $R_{caph}$ and the heat resistor $R_{ALh}$ are connected in parallel between the node 2 and the node 1, the node 1 represents the environmental temperature, wherein the heat resistor $R_{Caph}$ represents the convection heat exchange resistor between the end cap and the external environment, and the heat resistor $R_{ALh}$ represents the convection heat exchange resistor between the aluminum shell and the external environment.

One end of the temperature of the external environment $T_0$ is connected to the node 1, and the other end is connected to the ground.

The eddy-current loss in the aluminum shell $P_{AL}$ and the heat capacitor of the aluminum shell $C_{AL}$ are connected in parallel between the node 2 and the ground.

All the heat resistors $R_{R1}$, $R_{R2}$ and $R_{Rm}$ represent the equivalent resistors of the silicon steel sheets of the rotor.

The contact heat resistor $R_{ALRc}$ between the aluminum shell and the rotor is connected in series with the heat resistor $R_{R1}$ between the node 2 and the node 3, and the node 3 represents the medium temperature of the silicon steel sheets of the rotor.

The heat resistor $R_{R2}$ and the convection heat exchange resistor $R_{gaph}$ between the inner surface of the rotor and the air gap are serially connected between the node 3 and the node 6.

The heat resistor $R_{Rm}$ is connected between the node 3 and the node 4, and the node 4 represents the average temperature of the silicon steel sheets of the rotor.

The contact heat resistor $R_{PMRc}$ of the permanent magnet and the rotor is connected in series with the heat resistor $R_{PM1}$ of the permanent magnet between the node 4 and the node 5, and the node 5 represents the average temperature of the permanent magnet.

The iron loss $P_R$ of the rotor and the heat capacitor $C_R$ of the silicon steel sheets of the rotor are connected in series between the node 4 and the ground.

The loss $P_{PM}$ of the permanent magnet and the heat capacitor $C_{PM}$ of the permanent magnet are connected in series between the node 5 and the ground.

The motor thermoanalysis method with a temperature field directly coupled with a thermal circuit comprises the following steps.

1) A geometric model in finite element software is established for the inner stator part of the motor shown in FIG. 2, which comprises a winding, an insulator, a silicon steel sheet and a shaft, and material parameter information is formulated. Mesh generation is conducted to the geometric model through a mesh generation program, so as to obtain the mesh and node information required for finite element calculation. In the embodiment, the mesh generation of a finite element is subdivided by a most common tetrahedron element, and a boundary element is a triangle, but the embodiment is not limited to the generation method, and a hexahedron and a triangular prism can also be used in the mesh generation of the finite element; and the boundary element can also be a quadrangle or other element. The parameters of each heat resistor and heat capacitor are calculated according to an empirical formula for thermal circuit calculation.

2) The element in each thermal circuit model is converted into a one-dimensional finite element. For one element in the thermal circuit model, the heat resistor of the element is set as R, the node temperatures at the two ends of the heat resistor are respectively $T_1$ and $T_2$, the heat capacitors connected by the nodes at the two ends are $C_1$ and $C_2$, the concentrated heat sources connected by the nodes at the two ends are $f_1$ and $f_2$, the total heat flows flowing into the nodes at the two ends from other nodes or boundaries are $Q_1$ and $Q_2$, and the following formula can be obtained according to the conservation of energy:

$$[C] \cdot \left\{ \frac{dT}{dt} \right\} + [R] \cdot \{T\} = \{f\} + \{Q\}$$

$$[C] = \begin{bmatrix} C_1 & 0 \\ 0 & C_2 \end{bmatrix}, [R] = \begin{bmatrix} \frac{1}{R} & -\frac{1}{R} \\ -\frac{1}{R} & \frac{1}{R} \end{bmatrix},$$

$$\left\{ \frac{dT}{dt} \right\} = \begin{bmatrix} \frac{dT_1}{dt} \\ \frac{dT_2}{dt} \end{bmatrix} \{T\} = \begin{bmatrix} T_1 \\ T_2 \end{bmatrix}, \{f\} = \begin{bmatrix} f_1 \\ f_2 \end{bmatrix}, \{Q\} = \begin{bmatrix} Q_1 \\ Q_2 \end{bmatrix}$$

wherein, $$\frac{dT}{dt}$$

represents the change rate of the node temperatures at the two ends of the heat resistor with the time; compared with the structures of the element stiffness matrix, the element mass matrix and the element loading matrix in the finite element calculation, [C] is the element mass matrix of the one-dimensional finite element corresponding to the thermal circuit element, [R] is the corresponding element stiffness matrix, and {f} is the corresponding element loading matrix; and {Q} is a corresponding matrix of the total heat flows flowing to the nodes at the two ends from other nodes or boundaries. In this way, the thermal circuit area can be unified into the finite element solution area to solve together.

The information of each one-dimensional thermal circuit element needing to be added is calculated according to the values of the heat resistor and the heat capacitor obtained in step 1), and is saved to a document with a regulated format. Meanwhile, a subprogram for calculating the one-dimensional thermal circuit element is compiled according to the formula for calculating each element matrix above, so as to be invoked when the finite element calculates a main program.

3) The weak solution form of a differential equation of heat conduction containing the equivalent convection boundary and the equivalent temperature boundary is determined as follows:

$$\int_\Omega c \frac{\partial T}{\partial t} \delta T \cdot d\Omega + \int_\Omega (k \nabla T) \cdot (\nabla \delta T) \cdot d\Omega +$$
$$\int_{\Gamma_{hu}} h_u(T - T_u) \cdot \delta T \cdot d\Gamma + \int_{\Gamma_a} h_a \cdot T \cdot \delta T \cdot d\Gamma =$$
$$\int_{\Gamma_a} h_a \cdot T_a \cdot \delta T \cdot d\Gamma + \int_\Omega q \cdot \delta T \cdot d\Omega + \int_{\Gamma_{Te}} \left(k \frac{\partial T}{\partial n}\right) \cdot \delta T \cdot d\Gamma$$

wherein, $\Omega$ is a solution area corresponding to a geometric model subjected to mesh generation; c is a product of material density and specific heat capacity, T is temperature, t is time, k is a heat conductivity coefficient, $\delta T$ is virtual displacement, and $\nabla$ is a hamiltonian operator. $\Gamma_{hu}$ is the equivalent convection boundary, $h_u$ is a convection heat dispersion parameter on $\Gamma_{hu}$, and $T_u$ is an environment temperature corresponding to $\Gamma_{hu}$, which is equal to the temperature of some node in the thermal circuit area. $\Gamma_a$ is an ordinary convection boundary on the finite element area, $h_a$ is a convection heat dispersion parameter on $\Gamma_a$, and $T_a$ is an environment temperature corresponding to $\Gamma_a$; $\Gamma$ is a boundary variable, and q is heat source density. $\Gamma_{Te}$ is an equivalent temperature boundary, and n is a unit normal vector of an outer boundary.

According to the weak solution form of a differential equation of heat conduction, a finite element program generator (FEPG) is used to generate a main program of a general partial differential equation for solving a steady state heat conduction problem, and two special boundary conditions are not considered during the process of generating the program in the step.

4) A boundary element corresponding to the equivalent convection boundary is established. The equivalent convection boundary obtained according to the conservation of energy is as follows:

$$\int_{\Gamma_{hu}} h_u \cdot (T_u - T) \cdot d\Gamma = Q_u$$

wherein, $Q_u$ is the total heat flow flowing to the equivalent convection boundary from the thermal circuit area and other boundaries; when the finite element method is used to conduct dissociation and subdivision to the solution area, if the temperature $T^{(e)}$ on an element e on the equivalent convection boundary is represented as:

$$T^{(e)} = \sum_{j=1}^{m} T_j^{(e)} \cdot N_j^{(e)}$$

wherein, m is the total nodes contained in the element e, $T_j^{(e)}$ is the temperature of a node j, $N_j^{(e)}$ is a base function of interpolation of the element corresponding to the node j, then the discretization expression of the energy conservation expression on the equivalent convection boundary is as follows:

$$\sum_{\Gamma_{hu}} \left( h_u \cdot T_u \cdot S_e - \sum_{j=1}^{m} \left( T_j^{(e)} \cdot \int_{\Gamma_e} h_u \cdot N_j^{(e)} \cdot d\Gamma \right) \right) = \sum_{\Gamma_{hu}} Q_u^{(e)} = Q_u$$

wherein, $S_e$ is the area of the element e, $\Gamma_e$ is the area where the element e is located, and $Q_u^{(e)}$ is the heat flow flowing from the element e; and an element stiffness matrix $[N]_{\Gamma_{hu}}^{(e)}$ corresponding to the equivalent convection boundary element obtained by modifying the discretization expression and the third item from the left end in a weak solution form is as follows:

$$[N]_{\Gamma_{hu}}^{(e)} = \begin{bmatrix} a_{1,1} & a_{1,2} & \ldots & a_{1,m} & b_{1,(m+1)} \\ a_{2,1} & a_{2,2} & \ldots & a_{2,m} & b_{2,(m+1)} \\ \ldots & \ldots & \ldots & \ldots & \ldots \\ a_{m,1} & a_{m,2} & \ldots & a_{m,m} & b_{m,(m+1)} \\ b_{(m+1),1} & b_{(m+1),2} & \ldots & b_{(m+1),m} & c_{(m+1),(m+1)} \end{bmatrix}$$

wherein, m+1 is corresponding to the node representing the environmental temperature corresponding to $\Gamma_{hu}$ in the thermal circuit area, and matrix elements $a_{i,j}$, $b_{i,j}$ and $c_{i,j}$ are as follows:

$$a_{i,j} = \int_{\Gamma_e} h_u \cdot N_i^{(e)} \cdot N_j^{(e)} \cdot d\Gamma$$
$$b_{i,(m+1)} = b_{(m+1),i} = -\int_{\Gamma_e} h_u \cdot N_i^{(e)} \cdot d\Gamma$$
$$c_{(m+1),(m+1)} = h_u \cdot S_e$$

$N_j^{(e)}$ is a base function of interpolation of corresponding element for node i.

A related subprogram is compiled according to the method above for calculating the element stiffness matrix of the equivalent convection heat dispersion boundary, and the subprogram is invoked in the main program to calculate the element matrix on each equivalent convection boundary and overlay the element matrixes to the global matrix.

5) A boundary element corresponding to the equivalent temperature boundary is established. The equivalent temperature boundary is obtained according to the conservation of energy as follows:

$$\int_{\Gamma_{Te}} \left( k \cdot \frac{\partial T}{\partial n} \right) \cdot d\Gamma = Q_e$$

wherein, $Q_e$ is the total heat flow flowing into the equivalent temperature boundary $\Gamma_{Te}$ from the area modeled by the thermal circuit method and other boundaries; and if more than one node are comprised, the temperature $T^{(w)}$ on a fluid element w on the equivalent temperature boundary $\Gamma_{Te}$ is represented as:

$$T^{(w)} = \sum_{j=1}^{n} T_j^{(w)} \cdot N_j^{(w)} = \sum_{j=1}^{l} T_j^{(w)} \cdot N_j^{(w)} + T_e \cdot \sum_{j=l+1}^{n} N_j^{(w)}$$

wherein, $T_j^{(w)}$ is the temperature of a node j in the fluid element w, and $N_j^{(w)}$ is a base function of interpolation of the element corresponding to the node j in the fluid element w; the total number nodes comprised in the fluid element w is n, wherein a node 1 to a node l are not located on the equivalent temperature boundary $\Gamma_{Te}$, while a node l+1 to a node n are located on the equivalent temperature boundary $\Gamma_{Te}$, and the temperature of all the nodes on the equivalent temperature boundary $\Gamma_{Te}$ is $T_e$;

for the fluid element w, if assuming that a balance equation on the element can be obtained according to the weak solution form as follows:

$$[C]^{(w)} \cdot \frac{d}{dt} \{T\}^{(w)} + [K]^{(w)} \cdot \{T\}^{(w)} = \{f\}^{(w)} + \{Q\}^{(w)}$$

$$[C]^{(w)} = \begin{bmatrix} c_{1,1}^{(w)} & \cdots & c_{1,l}^{(w)} & \cdots & c_{1,n}^{(w)} \\ \cdots & \cdots & \cdots & \cdots & \cdots \\ c_{l,1}^{(w)} & \cdots & c_{l,l}^{(w)} & \cdots & c_{l,n}^{(w)} \\ \cdots & \cdots & \cdots & \cdots & \cdots \\ c_{n,1}^{(w)} & \cdots & c_{n,l}^{(w)} & \cdots & c_{n,n}^{(w)} \end{bmatrix},$$

$$[K]^{(w)} = \begin{bmatrix} k_{1,1}^{(w)} & \cdots & k_{1,l}^{(w)} & \cdots & k_{1,n}^{(w)} \\ \cdots & \cdots & \cdots & \cdots & \cdots \\ k_{l,1}^{(w)} & \cdots & k_{l,l}^{(w)} & \cdots & k_{l,n}^{(w)} \\ \cdots & \cdots & \cdots & \cdots & \cdots \\ k_{n,1}^{(w)} & \cdots & k_{n,l}^{(w)} & \cdots & k_{n,n}^{(w)} \end{bmatrix}, \{f\}^{(w)} = \begin{bmatrix} f_1^{(w)} \\ \cdots \\ f_l^{(w)} \\ \cdots \\ f_n^{(w)} \end{bmatrix}, \{T\}^{(w)} = \begin{bmatrix} T_1^{(w)} \\ \cdots \\ T_l^{(w)} \\ \cdots \\ T_{n^{(w)}} \end{bmatrix},$$

$$\{Q\}^{(w)} = \begin{bmatrix} 0 & \cdots & \int_{\Gamma_w} N_{l+1}^{(w)} k \frac{\partial T}{\partial n} d\Gamma & \cdots & \int_{\Gamma_w} N_n^{(w)} k \frac{\partial T}{\partial n} d\Gamma \end{bmatrix}^T$$

wherein, $[C]^{(w)}$, $[K]^{(w)}$ and $\{f\}^{(w)}$ are an element mass matrix, an element stiffness matrix and an element loading matrix of the fluid element respectively; $\{T\}^{(w)}$ is a vector composed of the temperature of each node, and $\{Q\}^{(w)}$ represents the vector of the heat flow flowing from the boundary node; and $\Gamma_w$ is the face of the fluid element w on $\Gamma_{Te}$;

for more than one node located on the fluid element w on the equivalent temperature boundary $\Gamma_{Te}$, since the temperatures of the node l+1 to the node n thereon are all equal to $T_e$, the element matrixes above are combined and represented as follows:

$$[C]^{(w)} = \begin{bmatrix} c_{1,1}^{(w)} & \cdots & c_{1,l}^{(w)} & \sum_{j=l+1}^{n} c_{1,j}^{(w)} \\ \cdots & \cdots & \cdots & \cdots \\ c_{l,1}^{(w)} & \cdots & c_{l,l}^{(w)} & \sum_{j=l+1}^{n} c_{l,j}^{(w)} \\ \sum_{j=l+1}^{n} c_{j,1}^{(w)} & \cdots & \sum_{j=l+1}^{n} c_{j,l}^{(w)} & \sum_{i=l+1}^{n} \sum_{j=l+1}^{n} c_{i,j}^{(w)} \end{bmatrix},$$

$$[K]^{(w)} = \begin{bmatrix} k_{1,1}^{(w)} & \cdots & k_{1,l}^{(w)} & \sum_{j=l+1}^{n} k_{1,j}^{(w)} \\ \cdots & \cdots & \cdots & \cdots \\ k_{l,1}^{(w)} & \cdots & k_{l,l}^{(w)} & \sum_{j=l+1}^{n} k_{l,j}^{(w)} \\ \sum_{j=l+1}^{n} k_{j,1}^{(w)} & \cdots & \sum_{j=l+1}^{n} k_{j,l}^{(w)} & \sum_{i=l+1}^{n} \sum_{j=l+1}^{n} k_{i,j}^{(w)} \end{bmatrix},$$

$$\{f\}^{(w)} = \begin{bmatrix} f_1^{(w)} \\ \cdots \\ f_l^{(w)} \\ \sum_{j=l+1}^{n} f_j^{(w)} \end{bmatrix},$$

$$\{T\}^{(w)} = [T_1^{(w)} \cdots T_l^{(w)} \ T_e]^T,$$

$$\{Q\}^{(w)} = \begin{bmatrix} 0 & \cdots & 0 & \int_{\Gamma_w} \sum_{j=l+1}^{n} N_j^{(w)} k \frac{\partial T}{\partial N} d\Gamma \end{bmatrix}^T =$$

$$\begin{bmatrix} 0 & \cdots & 0 & \int_{\Gamma_w} k \frac{\partial T}{\partial N} d\Gamma \end{bmatrix}^T = [0 \ \cdots \ 0 \ Q_e^{(w)}]^T$$

wherein, $Q_e^{(w)}$ represents the heat flow flowing from the face on the equivalent temperature boundary $\Gamma_{Te}$ through the fluid element w, and the summation thereof is equal to $Q_e$; in the process of combining the element matrixes of the fluid element w to a global matrix, all the nodes on the equivalent temperature boundary occupy the same position as that of the corresponding nodes of the boundary in the thermal circuit area in the global matrix.

For the programming processing in this part, it is not necessary to compile a corresponding subprogram, but the main program needs to be modified, so that these element matrixes on the fluid element w comprising more than one node on $\Gamma_{Te}$ are combined according to the description above.

Figure 3:
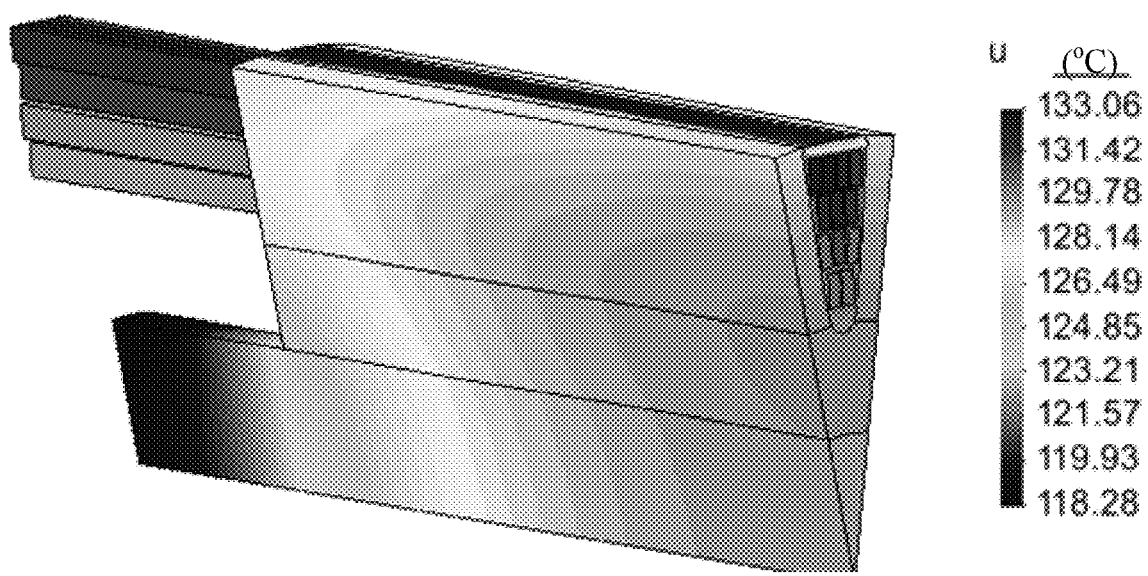
FIG. 3 is calculation temperature distribution of a finite element area.

6) Element matrixes of the fluid element, the boundary element and the one-dimensional finite element are overlaid to a global stiffness matrix, a global mass matrix and a global loading matrix to solve a global equation set, and the distribution of temperature of the thermal circuit area and the distribution of temperature of the finite element area are obtained simultaneously. That is, the main program is modified based on a calculation program frame generated in step 3), so that the subprogram for calculating the thermal circuit element matrix and the convection element matrix can be invoked by the main program, and the fluid element comprising more than one node on $\Gamma_{Te}$ can be combined. Finally, debugging and running the main program can calculate the distribution of temperature of the finite element area and the distribution of temperature of the thermal circuit area at the same time, wherein the distribution of temperature of the finite element obtained through calculation is as shown in FIG. 3.

The description above is only the preferred embodiment of the invention, and it should be noted that those skilled in the art may make a plurality of improvements and decorations without departing from the principle of the invention, and these improvements and decorations shall also fall within the protection scope of the invention.

What is claimed is:

1. A motor finite element thermoanalysis method with a temperature field directly coupled with a thermal circuit in a motor, wherein the thermal circuit comprises a computer-readable device and an instruction, and executes a processor for performing the following steps:
   1) analyzing temperature rise of the motor, selecting an area for modeling by a finite element method and an area for modeling by a thermal circuit method, and connecting two regions with at least one equivalent convection boundary and at least one equivalent temperature boundary of the two areas; conducting geometric modeling, parameter setting and mesh generation to the area modeled by the finite element method; establishing a thermal circuit model to the area modeled by the thermal circuit method according to an empirical formula, and calculating the numerical values of each heat resistor, heat capacitor capacity, and heat source;
   2) converting each element in the thermal circuit model into a one-dimensional finite element;
   3) determining a weak solution form of a differential equation of heat conduction containing at least one equivalent convection boundary and at least one equivalent temperature boundary;
   4) establishing a first boundary element corresponding to at least one equivalent convection boundary;
   5) establishing a second boundary element corresponding to at least one equivalent temperature boundary;
   6) combining element matrices of a fluid element, the first and second boundary elements, and the one dimensional finite element to a global stiffness matrix, a global mass matrix, and a global loading matrix, solving a global equation set; and
   7) re-distributing temperatures in the thermal circuit area and the finite element area of the motor, thereby reducing energy cost by providing prediction accuracy of the temperature rise inside the motor.

2. The motor finite element thermoanalysis method with the temperature field directly coupled with the thermal circuit according to claim 1, wherein in step 2), regarding to one element in the thermal circuit model, the heat resistor of the element is set as R, the node temperatures at the two ends of the heat resistor are respectively $T_1$ and $T_2$, the heat capacitors connected by the nodes at the two ends are $C_1$ and $C_2$, the concentrated heat sources connected by the nodes at the two ends are $f_1$ and $f_2$, the total heat flows flowing into the nodes at the two ends from other nodes or boundaries are $Q_1$ and $Q_2$, and the following formula is obtained according to the conservation of energy:

$$[C] \cdot \left\{\frac{dT}{dt}\right\} + [R] \cdot \{T\} = \{f\} + \{Q\}$$

-continued $$[C] = \begin{bmatrix} C_1 & 0 \\ 0 & C_2 \end{bmatrix}, [R] = \begin{bmatrix} \frac{1}{R} & -\frac{1}{R} \\ -\frac{1}{R} & \frac{1}{R} \end{bmatrix},$$

$$\left\{\frac{dT}{dt}\right\} = \begin{bmatrix} \frac{dT_1}{dt} \\ \frac{dT_2}{dt} \end{bmatrix}, \{T\} = \begin{bmatrix} T_1 \\ T_2 \end{bmatrix}, \{f\} = \begin{bmatrix} f_1 \\ f_2 \end{bmatrix}, \{Q\} = \begin{bmatrix} Q_1 \\ Q_2 \end{bmatrix}$$

wherein, $$\frac{dT}{dt}$$

represents the change rate of the node temperatures at the two ends of the heat resistor with the time; converted from the structures of the element stiffness matrix, the element mass matrix, and the element loading matrix in the finite element calculation, [C] is the element mass matrix of the one-dimensional finite element corresponding to the thermal circuit element, [R] is the corresponding element stiffness matrix, and $\{f\}$ is the corresponding element loading matrix; and $\{Q\}$ is a corresponding matrix of the total heat flows flowing to the nodes at the two ends from other nodes or boundaries.

3. The motor finite element thermoanalysis method with the temperature field directly coupled with the thermal circuit according to claim 1, wherein in step 3), the weak solution form of a partial differential equation containing one of equivalent convection boundaries from step 1) and one of equivalent temperature boundaries from step 1) is as follows:

$$\int_\Omega c \frac{\partial T}{\partial t} \delta T \cdot d\Omega + \int_\Omega (k\nabla T) \cdot (\nabla \delta T) \cdot d\Omega +$$
$$\int_{\Gamma_{hu}} h_u(T - T_u) \cdot \delta T \cdot d\Gamma + \int_{\Gamma_a} h_a \cdot T \cdot \delta T \cdot d\Gamma =$$
$$\int_{\Gamma_a} h_a \cdot T_a \cdot \delta T \cdot d\Gamma + \int_\Omega q \cdot \delta T \cdot d\Omega + \int_{\Gamma_{Te}} \left(k \frac{\partial T}{\partial n}\right) \cdot \delta T \cdot d\Gamma$$

wherein, $\Omega$ is a solution area corresponding to a geometric model subjected to mesh generation; c is a product of material density and specific heat capacity, T is temperature, t is time, k is a heat conductivity coefficient, $\delta T$ is virtual displacement, and $\nabla$ is a hamiltonian operator; $\Gamma_{hu}$ is one of the equivalent convection boundaries from step 1), $h_u$ is a convection heat dispersion parameter on $\Gamma_{hu}$, and $\Gamma_u$ is an environmental temperature corresponding to $\Gamma_{hu}$, which is equal to the temperature of a node in the thermal circuit area; $\Gamma_a$ is an ordinary convection boundary on the finite element area, $h_a$ is a convection heat dispersion parameter on $\Gamma_a$, and $T_a$ is an environmental temperature corresponding to $\Gamma_a$; $\Gamma$ is a boundary variable, and q is heat source density; and $\Gamma_{Te}$ is one of the equivalent temperature boundaries from step 1), and n is a unit normal vector of an outer boundary.

4. The motor finite element thermoanalysis method with the temperature field directly coupled with the thermal circuit according to claim 3, wherein in step 4), the equivalent convection boundary obtained according to the conservation of energy is as follows:

$$\int_{\Gamma_{hu}} h_u \cdot (T_u - T) \cdot d\Gamma = Q_u$$

wherein, $Q_u$ is the total heat flow flowing to the equivalent convection boundary from the thermal circuit area and other boundaries; when the finite element method is used to conduct dissociation and subdivision to the solution area, if the temperature $T^{(e)}$ on an element e on the equivalent convection boundary is represented as:

$$T^{(e)} = \sum_{j=1}^{m} T_j^{(e)} \cdot N_j^{(e)}$$

wherein, m is the total nodes contained in the element e, $T_j^{(e)}$ is the temperature of a node j, $N_j^{(e)}$ is a base function of interpolation of the element corresponding to the node j, then the discretization expression of the energy conservation expression on the equivalent convection boundary is as follows:

$$\sum_{\Gamma_{hu}} \left( h_u \cdot T_u \cdot S_e - \sum_{j=1}^{m} \left( T_j^{(e)} \cdot \int_{\Gamma_e} h_u \cdot N_j^{(e)} \cdot d\Gamma \right) \right) = \sum_{\Gamma_{hu}} Q_u^{(e)} = Q_u$$

wherein, $S_e$ is the area of the element e, $\Gamma_e$ is the area where the element e is located, and $Q_u^{(e)}$ is the heat flow flowing from the element e; and an element stiffness matrix $[N]_{\Gamma_{h_u}}^{(e)}$ corresponding to the equivalent convection boundary element obtained by modifying the discretization expression and the third term from the left end in a weak solution form is as follows:

$$[N]_{\Gamma_{hu}}^{(e)} = \begin{bmatrix} a_{1,1} & a_{1,2} & \cdots & a_{1,m} & b_{1,(m+1)} \\ a_{2,1} & a_{2,2} & \cdots & a_{2,m} & b_{2,(m+1)} \\ \cdots & \cdots & \cdots & \cdots & \cdots \\ a_{m,1} & a_{m,2} & \cdots & a_{m,m} & b_{m,(m+1)} \\ b_{(m+1),1} & b_{(m+1),2} & \cdots & b_{(m+1),m} & c_{(m+1),(m+1)} \end{bmatrix}$$

wherein, m+1 is corresponding to the node representing the environmental temperature corresponding to $\Gamma_{hu}$ in the thermal circuit area, and matrix elements $a_{i,j}$, $b_{i,j}$ and $c_{i,j}$ are as follows:

$$a_{i,j} = \int_{\Gamma_e} h_u \cdot N_i^{(e)} \cdot N_j^{(e)} \cdot d\Gamma$$

$$b_{i,(m+1)} = b_{(m+1),i} = -\int_{\Gamma_e} h_u \cdot N_i^{(e)} \cdot d\Gamma$$

$$c_{(m+1),(m+1)} = h_u \cdot S_e$$

$[N]_j^{(e)}$ is a base function of interpolation of corresponding element for node i.

5. The motor finite element thermoanalysis method with the temperature field directly coupled with the thermal circuit according to claim 3, wherein in step 5), the equivalent temperature boundary is obtained according to the conservation of energy as follows:

$$\int_{\Gamma_{Te}} \left( k \cdot \frac{\partial T}{\partial n} \right) \cdot d\Gamma = Q_e$$

wherein, $Q_e$ is the total heat flow flowing into the equivalent temperature boundary $\Gamma_{Te}$ from the area modeled by the thermal circuit method and other boundaries; and the temperature $T^{(w)}$ on a fluid element won the equivalent temperature boundary $\Gamma_{Te}$ is represented as:

$$T^{(w)} = \sum_{j=1}^{n} T_j^{(w)} \cdot N_j^{(w)} = \sum_{j=1}^{l} T_j^{(w)} \cdot N_j^{(w)} + T_e \cdot \sum_{j=l+1}^{n} N_j^{(w)}$$

wherein, $T_j^{(w)}$ is the temperature of a node j in the fluid element w, and $N_j^{(w)}$ is a base function of interpolation of the element corresponding to the node j in the fluid element w; the total number nodes comprised in the fluid element w is n, wherein a node 1 to a node l are not located on the equivalent temperature boundary $\Gamma_{Te}$, while a node l+1 to a node n are located on the equivalent temperature boundary $\Gamma_{Te}$, and the temperature of all the nodes on the equivalent temperature boundary $\Gamma_{Te}$ is $T_e$;

a balance equation on the fluid element is obtained according to the weak solution form as follows:

$$[C]^{(w)} \cdot \frac{d}{dt} \{T\}^{(w)} + [K]^{(w)} \cdot \{T\}^{(w)} = \{f\}^{(w)} + \{Q\}^{(w)}$$

$$[C]^{(w)} = \begin{bmatrix} c_{1,1}^{(w)} & \cdots & c_{1,l}^{(w)} & \cdots & c_{1,n}^{(w)} \\ \cdots & \cdots & \cdots & \cdots & \cdots \\ c_{l,1}^{(w)} & \cdots & c_{l,l}^{(w)} & \cdots & c_{l,n}^{(w)} \\ \cdots & \cdots & \cdots & \cdots & \cdots \\ c_{n,1}^{(w)} & \cdots & c_{n,l}^{(w)} & \cdots & c_{n,n}^{(w)} \end{bmatrix},$$

$$[K]^{(w)} = \begin{bmatrix} k_{1,1}^{(w)} & \cdots & k_{1,l}^{(w)} & \cdots & k_{1,n}^{(w)} \\ \cdots & \cdots & \cdots & \cdots & \cdots \\ k_{l,1}^{(w)} & \cdots & k_{l,l}^{(w)} & \cdots & k_{l,n}^{(w)} \\ \cdots & \cdots & \cdots & \cdots & \cdots \\ k_{n,1}^{(w)} & \cdots & k_{n,l}^{(w)} & \cdots & k_{n,n}^{(w)} \end{bmatrix},$$

$$\{f\}^{(w)} = \begin{bmatrix} f_1^{(w)} \\ \cdots \\ f_l^{(w)} \\ \cdots \\ f_n^{(w)} \end{bmatrix}, \{T\}^{(w)} = \begin{bmatrix} T_1^{(w)} \\ \cdots \\ T_l^{(w)} \\ \cdots \\ T_n^{(w)} \end{bmatrix},$$

$$\{Q\}^{(w)} = \begin{bmatrix} 0 & \cdots & \int_{\Gamma_w} N_{l+1}^{(w)} k \frac{\partial T}{\partial n} d\Gamma & \cdots & \int_{\Gamma_w} N_n^{(w)} k \frac{\partial T}{\partial n} d\Gamma \end{bmatrix}^T$$

wherein, w is the fluid element; $[C]^{(w)}$, $[K]^{(w)}$ and $\{f\}^{(w)}$ are an element mass matrix, an element stiffness matrix and an element loading matrix of the fluid element respectively; $\{T\}^{(w)}$ is a vector composed of the temperature of each node, and $\{Q\}^{(w)}$ represents the vector of the heat flow flowing from the boundary node; and $\Gamma_w$ is the face of the fluid element won $\Gamma_{Te}$;

for more than one node located on the fluid element won the equivalent temperature boundary $\Gamma_{Te}$, the temperatures of the node l+1 to the node n thereon are all equal to $T_e$, the element matrixes above are combined and represented as follows:

$$[C]^{(w)} = \begin{bmatrix} c_{1,1}^{(w)} & \cdots & c_{1,l}^{(w)} & \sum_{j=l+1}^{n} c_{1,j}^{(w)} \\ \cdots & \cdots & \cdots & \cdots \\ c_{l,1}^{(w)} & \cdots & c_{l,l}^{(w)} & \sum_{j=l+1}^{n} c_{l,j}^{(w)} \\ \sum_{j=l+1}^{n} c_{j,1}^{(w)} & \cdots & \sum_{j=l+1}^{n} c_{j,l}^{(w)} & \sum_{i=l+1}^{n} \sum_{j=l+1}^{n} c_{i,j}^{(w)} \end{bmatrix},$$

$$[K]^{(w)} = \begin{bmatrix} k_{1,1}^{(w)} & \cdots & k_{1,l}^{(w)} & \sum_{j=l+1}^{n} k_{1,j}^{(w)} \\ \cdots & \cdots & \cdots & \cdots \\ k_{l,1}^{(w)} & \cdots & k_{l,l}^{(w)} & \sum_{j=l+1}^{n} k_{l,j}^{(w)} \\ \sum_{j=l+1}^{n} k_{j,1}^{(w)} & \cdots & \sum_{j=l+1}^{n} k_{j,l}^{(w)} & \sum_{i=l+1}^{n} \sum_{j=l+1}^{n} k_{i,j}^{(w)} \end{bmatrix},$$

$$\{f\}^{(w)} = \begin{bmatrix} f_1^{(w)} \\ \cdots \\ f_l^{(w)} \\ \sum_{j=l+1}^{n} f_j^{(w)} \end{bmatrix}, \{T\}^{(w)} = [\, T_1^{(w)} \; \cdots \; T_l^{(w)} \; T_e\,]^T,$$

$$\{Q\}^{(w)} = \begin{bmatrix} 0 & \cdots & 0 & \int_{\Gamma_w} \sum_{j=l+1}^{n} N_j^{(w)} k \frac{\partial T}{\partial n} d\Gamma \end{bmatrix}^T =$$

$$\begin{bmatrix} 0 & \cdots & 0 & \int_{\Gamma_w} k \frac{\partial T}{\partial n} d\Gamma \end{bmatrix}^T = [\, 0 \; \cdots \; 0 \; Q_e^{(w)}\,]^T$$

wherein, $Q_e^{(w)}$ represents the heat flow flowing from the face on the equivalent temperature boundary $\Gamma_{Te}$ through the fluid element w, and the summation thereof is equal to $Q_e$; in the process of combining the element matrixes of the fluid element w to a global matrix, all the nodes on the equivalent temperature boundary occupy the same position as that of the corresponding nodes of the boundary in the thermal circuit area in the global matrix.

6. The motor finite element thermoanalysis method with the temperature field directly coupled with the thermal circuit according to claim 4, wherein in step 5), the equivalent temperature boundary is obtained according to the conservation of energy as follows:

$$\int_{\Gamma_{Te}} \left( k \cdot \frac{\partial T}{\partial n} \right) \cdot d\Gamma = Q_e$$

wherein, $Q_e$ is the total heat flow flowing into the equivalent temperature boundary $\Gamma_{Te}$ from the area modeled by the thermal circuit method and other boundaries; and the temperature $T^{(w)}$ on a fluid element w on the equivalent temperature boundary $\Gamma_{Te}$ is represented as:

$$T^{(w)} = \sum_{j=1}^{n} T_j^{(w)} \cdot N_j^{(w)} = \sum_{j=1}^{l} T_j^{(w)} \cdot N_j^{(w)} + T_e \cdot \sum_{j=l+1}^{n} N_j^{(w)}$$

wherein, $T_j^{(w)}$ is the temperature of a node j in the fluid element w, and $N_j^{(w)}$ is a base function of interpolation of the element corresponding to the node j in the fluid element w; the total number nodes comprised in the fluid element w is n, wherein a node 1 to a node l are not located on the equivalent temperature boundary $\Gamma_{Te}$, while a node l+1 to a node n are located on the equivalent temperature boundary $\Gamma_{Te}$, and the temperature of all the nodes on the equivalent temperature boundary $\Gamma_{Te}$ is $T_e$;

a balance equation on the fluid element is obtained according to the weak solution form as follows:

$$[C]^{(w)} \cdot \frac{d}{dt} \{T\}^{(w)} + [K]^{(w)} \cdot \{T\}^{(w)} = \{f\}^{(w)} + \{Q\}^{(w)}$$

$$[C]^{(w)} = \begin{bmatrix} c_{1,1}^{(w)} & \cdots & c_{1,l}^{(w)} & \cdots & c_{1,n}^{(w)} \\ \cdots & \cdots & \cdots & \cdots & \cdots \\ c_{l,1}^{(w)} & \cdots & c_{l,l}^{(w)} & \cdots & c_{l,n}^{(w)} \\ \cdots & \cdots & \cdots & \cdots & \cdots \\ c_{n,1}^{(w)} & \cdots & c_{n,l}^{(w)} & \cdots & c_{n,n}^{(w)} \end{bmatrix},$$

$$[K]^{(w)} = \begin{bmatrix} k_{1,1}^{(w)} & \cdots & k_{1,l}^{(w)} & \cdots & k_{1,n}^{(w)} \\ \cdots & \cdots & \cdots & \cdots & \cdots \\ k_{l,1}^{(w)} & \cdots & k_{l,l}^{(w)} & \cdots & k_{l,n}^{(w)} \\ \cdots & \cdots & \cdots & \cdots & \cdots \\ k_{n,1}^{(w)} & \cdots & k_{n,l}^{(w)} & \cdots & k_{n,n}^{(w)} \end{bmatrix},$$

$$\{f\}^{(w)} = \begin{bmatrix} f_1^{(w)} \\ \cdots \\ f_l^{(w)} \\ \cdots \\ f_n^{(w)} \end{bmatrix}, \{T\}^{(w)} = \begin{bmatrix} T_1^{(w)} \\ \cdots \\ T_l^{(w)} \\ \cdots \\ T_n^{(w)} \end{bmatrix},$$

$$\{Q\}^{(w)} = \begin{bmatrix} 0 & \cdots & \int_{\Gamma_w} N_{l+1}^{(w)} k \frac{\partial T}{\partial n} d\Gamma & \cdots & \int_{\Gamma_w} N_n^{(w)} k \frac{\partial T}{\partial n} d\Gamma \end{bmatrix}^T$$

wherein, w is the fluid element; $[C]^{(w)}$, $[K]^{(w)}$ and $\{f\}^{(w)}$ are an element mass matrix, an element stiffness matrix and an element loading matrix of the fluid element respectively; $\{T\}^{(w)}$ is a vector composed of the temperature of each node, and $\{Q\}^{(w)}$ represents the vector of the heat flow flowing from the boundary node; and $\Gamma_w$ is the face of the fluid element w on $\Gamma_{Te}$;

for more than one node located on the fluid element w on the equivalent temperature boundary $\Gamma_{Te}$, the temperatures of the node l+1 to the node n thereon are all equal to $T_e$, the element matrixes above are combined and represented as follows:

$$[C]^{(w)} = \begin{bmatrix} c_{1,1}^{(w)} & \cdots & c_{1,l}^{(w)} & \sum_{j=l+1}^{n} c_{1,j}^{(w)} \\ \cdots & \cdots & \cdots & \cdots \\ c_{l,1}^{(w)} & \cdots & c_{l,l}^{(w)} & \sum_{j=l+1}^{n} c_{l,j}^{(w)} \\ \sum_{j=l+1}^{n} c_{j,1}^{(w)} & \cdots & \sum_{j=l+1}^{n} c_{j,l}^{(w)} & \sum_{i=l+1}^{n} \sum_{j=l+1}^{n} c_{i,j}^{(w)} \end{bmatrix},$$

$$[K]^{(w)} = \begin{bmatrix} k_{1,1}^{(w)} & \cdots & k_{1,l}^{(w)} & \sum_{j=l+1}^{n} k_{1,j}^{(w)} \\ \cdots & \cdots & \cdots & \cdots \\ k_{l,1}^{(w)} & \cdots & k_{l,l}^{(w)} & \sum_{j=l+1}^{n} k_{l,j}^{(w)} \\ \sum_{j=l+1}^{n} k_{j,1}^{(w)} & \cdots & \sum_{j=l+1}^{n} k_{j,l}^{(w)} & \sum_{i=l+1}^{n} \sum_{j=l+1}^{n} k_{i,j}^{(w)} \end{bmatrix},$$

$$\{f\}^{(w)} = \begin{bmatrix} f_1^{(w)} \\ \cdots \\ f_l^{(w)} \\ \sum_{j=i+1}^{n} f_j^{(w)} \end{bmatrix}, \{T\}^{(w)} = [\, T_1^{(w)} \; \cdots \; T_l^{(w)} \; T_e \,]^T,$$

$$\{Q\}^{(w)} = \begin{bmatrix} 0 & \cdots & 0 & \int_{\Gamma_w} \sum_{j=l+1}^{n} N_j^{(w)} k \frac{\partial T}{\partial n} d\Gamma \end{bmatrix}^T =$$

$$\begin{bmatrix} 0 & \cdots & 0 & \int_{\Gamma_w} k \frac{\partial T}{\partial n} d\Gamma \end{bmatrix}^T = [\, 0 \; \cdots \; 0 \; Q_e^{(w)} \,]^T$$

wherein, $Q_e^{(w)}$ represents the heat flow flowing from the face on the equivalent temperature boundary $\Gamma_{Te}$ through the fluid element w, and the summation thereof is equal to $Q_e$; in the process of combining the element matrixes of the fluid element w to a global matrix, all the nodes on the equivalent temperature boundary occupy the same position as that of the corresponding nodes of the boundary in the thermal circuit area in the global matrix.

\* \* \* \* \*